(12) United States Patent
Magdina et al.

(10) Patent No.: US 8,772,384 B2
(45) Date of Patent: Jul. 8, 2014

(54) FIRE-RESISTANT COATING MATERIAL ADINA

(75) Inventors: Roman Magdina, Prievidza IV Kooanice (SK); Lubomir Něrpeček, Kurdějov (CZ)

(73) Assignee: Moles Technology, A.S., Bratislava (SK)

( * ) Notice: Subject to any disclaimer, the term of this patent is extended or adjusted under 35 U.S.C. 154(b) by 1 day.

(21) Appl. No.: 13/261,699

(22) PCT Filed: Feb. 7, 2012

(86) PCT No.: PCT/SK2012/050001
§ 371 (c)(1),
(2), (4) Date: Jul. 29, 2013

(87) PCT Pub. No.: WO2012/115595
PCT Pub. Date: Aug. 30, 2012

(65) Prior Publication Data
US 2013/0331490 A1    Dec. 12, 2013

(30) Foreign Application Priority Data
Feb. 24, 2011   (SK) .............................. 50024-2011 U

(51) Int. Cl.
| | |
|---|---|
| *C08K 5/34* | (2006.01) |
| *C08K 5/3492* | (2006.01) |
| *C08C 19/02* | (2006.01) |
| *C08K 5/51* | (2006.01) |
| *C08K 5/05* | (2006.01) |
| *C09D 5/18* | (2006.01) |
| *C08J 3/22* | (2006.01) |
| *C08K 3/34* | (2006.01) |

(52) U.S. Cl.
USPC ............ 524/147; 524/100; 524/387; 524/451

(58) Field of Classification Search
USPC .......................... 524/101, 100, 147, 387, 451
See application file for complete search history.

(56) References Cited

U.S. PATENT DOCUMENTS

| | | | |
|---|---|---|---|
| 3,635,970 A | 1/1972 | Fessler et al. | 260/249.6 |
| 3,654,190 A | 4/1972 | Levine | 260/2.5 FP |
| 4,965,296 A | 10/1990 | Hastings | 523/179 |
| 5,532,292 A | 7/1996 | Wainwright et al. | 523/179 |
| 2006/0041042 A1* | 2/2006 | Thewes et al. | 524/115 |
| 2006/0106139 A1* | 5/2006 | Kosaka et al. | 524/90 |
| 2007/0261878 A1* | 11/2007 | Kosaka et al. | 174/110 SR |
| 2009/0186970 A1* | 7/2009 | Ronan et al. | 524/190 |

FOREIGN PATENT DOCUMENTS

| | | | | |
|---|---|---|---|---|
| WO | WO 94/02545 | 2/1994 | | C08K 7/10 |
| WO | WO 2010/131037 A1 | 11/2010 | | C09D 5/18 |

\* cited by examiner

*Primary Examiner* — Angela C Scott
(74) *Attorney, Agent, or Firm* — Ohlandt, Greeley, Ruggiero & Perle, L.L.P.

(57) ABSTRACT

Fire-resistant coating material ADINA comprising ammonium polyphosphate in the amount of 5 to 50% w/w, pentaerythritol in the amount of 6 to 33% w/w, melamine in the amount of 4 to 22% w/w, binder based on polyvinylacrylate dispersion in the amount of 10 to 16.3% w/w, plasticizer based on diisononylphthalate in the amount of 2.3 to 3.5% w/w, talc in the amount of 3 to 10% w/w, stabilizer (preservative) based on 4-chloro-3-methylphenol in the amount of 0.15 to 0.25% w/w, and water in the amount of 13.5 to 17% w/w.

2 Claims, No Drawings

FIRE-RESISTANT COATING MATERIAL ADINA

This Patent Application is the US National Stage Patent Application of PCT Patent Application No. PCT/SK2012/050001, filed 7 Feb. 2012, claiming priority from Slovak Republic Patent Application No. PUV 50024-2011, filed Feb. 24, 2011.

FIELD OF THE INVENTION

The invention relates to coating materials for technical purposes, especially fire-resistant coating materials ADINA.

BACKGROUND OF THE INVENTION

Fire-resistant coating materials for technical purposes are well-known and widely used in industry. The so-called intumescent technical coatings are special coatings for special purposes. Their application shall be performed only by trained experts on the basis of fire safety specialists recommendation, wherein the exact thickness of coating has to be followed in application.

The aim of intumescent coatings with higher fire-resistance is to increase the resistance of industrial buildings against fire in case of e.g. burning of building constructions, or possibly to prolong their functionality in case of e.g. burning of electric cables. Intumescent coatings or coating materials are most commonly used in practice. During fire, the coating is getting swollen (thus creating a mechanical barrier), which process is allowed due to a component comprising phosphorus. The swelling of coating provides the industrial buildings with protection against destructive effects of fire, if possible until the time the fire can be extinguished. Therefore, the intumescent coatings can be applied only by experts trained for handling these materials, and the exact thickness of coatings on the basis previous recommendations of fire safety specialists has to be followed during their application. Also, they are sold in specialized shops.

The known coating materials usually include swelling components, film-making binding components, which provide for making the film and for adhesion to a substrate, on which the material is applied, and alternatively they can comprise various pigments and other colouring agents.

For example U.S. Pat. No. 3,654,190 discloses an intumescent coating increasing the fire resistance, comprising melamine, dipentaerythritol, a component comprising phosphorus, and chlorinated paraffin. A disadvantage of the said coating consists in its low resistance against weather conditions, as well as its cracking (destruction) during the fire.

U.S. Pat. No. 3,635,970 discloses an oil coating, comprising not only melamine pyrophosphate and dipentaerythritol, but also chlorinated paraffin as a component which suppresses burning.

U.S. Pat. No. 4,965,296 discloses a liquid intumescent coating comprising not only ammonium phosphate, diammonium phosphate, ammonium polyphosphate or potassium tripolyphosphate, or combinations thereof, but also dipentaerythritol, polyol or chlorinated paraffin, or combinations thereof, melamine resin, urea, or dicyandiamide, or combinations thereof, in the amount of 5 to 35% w/w. Its disadvantages include low resistance against weather conditions, as well as relatively low plasticity of intumescence due to a high viscosity of carbon layer, which decreases thermal-insulation properties.

Besides the above mentioned low resistance to weather conditions, most of the presently available and used fire-resistance coatings are insufficiently adhesive and thus insufficiently resistant to abrasion and also liable to mechanical damage. Moreover, they have quite a high degree of humidity absorbing.

The object of the present invention is to provide a fire-resistance coating material with eliminated undesired properties of previously known and used intumescent technical coatings.

SUMMARY OF THE INVENTION

The above mentioned disadvantages are substantially eliminated by fire-resistant coating material ADINA according to the present invention, comprising ammonium polyphosphate in the amount of 5 to 50 w/w, pentaerythritol in the amount of 6 to 33% w/w, melamine in the amount of 4 to 22% w/w, binder (adhesive based on dispersion of polyvinylacrylate—PVAcry, preferably of quality degree D3) in the amount of 10 to 16.3% w/w, plasticizer based on diisononylphthalate (DINP) in the amount of 2.3 to 3.5% w/w, talc in the amount of 3 to 10% w/w, stabilizer (preservative) based on 4-chloro-3-methylphenol in the amount of 0.15 to 0.25% w/w, and water in the amount of 13.5 to 17% w/w.

It was found out that the coating material ADINA according to the present invention preferably comprises ammonium polyphosphate in the amount of 25 to 35% w/w, pentaerythritol in the amount of 16 to 25% w/w, melamine in the amount of 9 to 17% w/w, binder in the amount of 12.5 to 16% w/w, plasticizer in the amount of 2.8 to 3.2% w/w, talc in the amount of 6 to 8.5% w/w, stabilizer in the amount of 0.18 to 0.22% w/w, and water in the amount of 13.5 to 15.5% w/w.

It was also found out that it is possible to use other phosphate derivative as well, e.g. ammonium polyphosphate, instead of melamine it is possible to use its derivatives, e.g. melamine cyanurate, melamine borate, melamine polyphosphate, melamine diphosphate, melamine pyrophosphate and melamine phosphate, and it is also possible to use monopentaerythritol or dipentaerythritol.

By adjusting the contents of individual components it is possible to gain the coating material ADINA with different physicochemical properties, which allow its use in various industrial fields.

The coating material ADINA according to the present invention can be prepared by simple mixing of individual components in the homogenizer.

The advantage of the present coating material ADINA consists mainly in the fact that although it is the so-called technical coating, its physicochemical properties can compete with decorative and technical coatings, which have higher requirements for these parameters. These particularly include an exceptional adhesiveness, which in combination with plasticity creates a high (thick) carbon layer during the fire, being gradually getting bigger and swollen due to high temperatures during the fire (because the carbon layer contains air bubbles), and provides for extraordinary thermal-insulation properties even if only a thin layer is applied.

The examples below illustrate the present invention without limiting its scope.

EXAMPLES

Example No. 1

Fire-Resistant Coating Material ADINA for Application by Rolling

Composition:

| | |
|---|---:|
| Ammonium phosphate | 31% w/w |
| Pentaerythritol | 18% w/w |
| Melamine | 13% w/w |
| Binder (adhesive based on PVAcry) | 14% w/w |
| Water | 13.8% w/w |
| Plasticizer (DINP) | 3% w/w |
| Stabilizer (PARMETOL) | 0.2% w/w |
| Talc | 7% w/w |

Process for Production (Identical for all Types of ADINA Coating Materials)

Individual components were dosed and homogenized in the homogenizer in the following order: ammonium polyphosphate, pentaerythritol, melamine and talc, and were thoroughly stirred.

The binder part of the fire-resistant coating material was prepared and homogenized separately, comprising ⅔ of water from the total amount+adhesive based on PVAcry+DINP+stabilizer, and was added to the mixture of ammonium polyphosphate, pentaerythritol, melamine and talc, homogenized and finally the remaining ⅓ of water was added.

Example No. 2

Fire-Resistant Coating Material ADINA for Application by Levelling

Composition:

| | |
|---|---:|
| Ammonium phosphate | 7% w/w |
| Pentaerythritol | 31% w/w |
| Melamine | 22% w/w |
| Binder (adhesive based on PVAcry) | 14% w/w |
| Water | 15.8% w/w |
| Plasticizer (DINP) | 3% w/w |
| Stabilizer (PARMETOL) | 0.2% w/w |
| Talc | 7% w/w |

Example No. 3

Fire-Resistant Coating Material ADINA for Application by Filling

Thin Consistency

Composition:

| | |
|---|---:|
| Ammonium phosphate | 40% w/w |
| Pentaerythritol | 8% w/w |
| Melamine | 10.8% w/w |
| Binder (adhesive based on PVAcry) | 14% w/w |
| Water | 17% w/w |
| Plasticizer (DINP) | 3% w/w |
| Stabilizer (PARMETOL) | 0.2% w/w |
| Talc | 7% w/w |

Example No. 4

Fire-Resistant Coating Material ADINA for Application by Spraying

Composition:

| | |
|---|---:|
| Ammonium phosphate | 30% w/w |
| Pentaerythritol | 18% w/w |
| Melamine | 12% w/w |
| Binder (adhesive based on polyvinylacrylate) | 14% w/w |
| Water | 15.8% w/w |
| Plasticizer (DINP) | 3% w/w |
| Stabilizer (PARMETOL) | 0.2% w/w |
| Talc | 7% w/w |

Comparison of physicochemical properties of fire-resistant coating material ADINA according to Example 1 and wood and metal paint for exterior use is shown in the table below.

TABLE

| Technical properties | Material of Example 1 | ACTIN W (technical data sheet) |
|---|---|---|
| Colour | white | white |
| Dry matter content | min. 70% | bright min. 40% matte min. 50% |
| Volume weight | 1400 kg/m$^3$ | bright cca 1100 kg/m$^3$ matte cca 1400 kg/m$^3$ |
| Viscosity | 1500-6700 mPa · s | cca 1500-6000 mPa · s |
| Adhesive power to the base | min. 0.25 MPa | min. 0.25 MPa |
| Adhesive power to the base after test of resistance to sudden changes of temperature | min. 0.25 MPa | min. 0.25 MPa |
| Frost resistance (adhesiveness to the base after 15 freezing cycles) | min. 0.25 MPa | min. 0.25 MPa |
| Equivalent diffusion thickness RH20 | max. 1 m | max. 1.5 m |
| Abrasion-resistance | min. 20 minutes | min. 20 minutes |
| Water-resistance | 0 L/m$^2$ · 30 minutes | 0 L/m$^2$ · 30 minutes |

As can be seen in the table above, the fire-resistant coating material ADINA meets all physicochemical requirements not only for fire-resistant coatings, but also for standard technical and decorative coatings.

The invention claimed is:

1. Fire-resistant coating material, characterized in that it comprises ammonium polyphosphate in the amount of 5 to 50% w/w, pentaerythritol in the amount of 6 to 33% w/w, melamine in the amount of 4 to 22% w/w, binder based on polyvinylacrylate dispersion in the amount of 10 to 16.3% w/w, plasticizer based on diisononylphthalate in the amount of 2.3 to 3.5% w/w, talc in the amount of 3 to 10% w/w, stabilizer based on 4-chloro-3-methylphenol in the amount of 0.15 to 0.25% w/w, and water in the amount of 13.5 to 17% w/w.

2. Fire-resistant coating material according to claim 1, characterized in that it comprises ammonium polyphosphate in the amount of 25 to 35% w/w, pentaerythritol in the amount of 16 to 25% w/w, melamine in the amount of 9 to 17% w/w, binder in the amount of 12.5 to 16% w/w, plasticizer in the amount of 2.8 to 3.2% w/w, talc in the amount of 6 to 8.5% w/w, stabilizer in the amount of 0.18 to 0.22% w/w, and water in the amount of 13.5 to 15.5% w/w.

\* \* \* \* \*